United States Patent [19]
Tomiyama

[11] 3,728,815
[45] Apr. 24, 1973

[54] ACROBATIC TOY ROBOT
[75] Inventor: Eijiro Tomiyama, Tokyo, Japan
[73] Assignee: Tomy Kogyo Co., Ltd., Tokyo, Japan
[22] Filed: Jan. 5, 1971
[21] Appl. No.: 104,052

[52] U.S. Cl. ................................46/104, 46/134
[51] Int. Cl. ...............................................A63h 11/10
[58] Field of Search.......................46/134, 130, 104, 46/245, 247

[56] References Cited
UNITED STATES PATENTS 3,103,762   9/1963   Glass et al. ..............................46/104
3,500,577   3/1970   Bart........................................46/134

Primary Examiner—Robert Peshock
Assistant Examiner—A. Heinz
Attorney—Toren and McGeady

[57] ABSTRACT

An acrobatic toy robot which comprises a body having a head and rotatable arms, wheel means for driving the robot on a supporting surface and power means in operative connection with said arms and said wheel means, said arms being arranged to overturn the robot when the latter comes into contact with an obstruction and to cause the robot to perform a somersault-like movement when the same is overturned, whereby the robot is arranged to repeat travelling in an upright position and performing such a comical movement.

4 Claims, 10 Drawing Figures

Patented April 24, 1973  3,728,815

INVENTOR.
EIJIRO TOMIYAMA
BY Toren and McGeady
ATTORNEYS

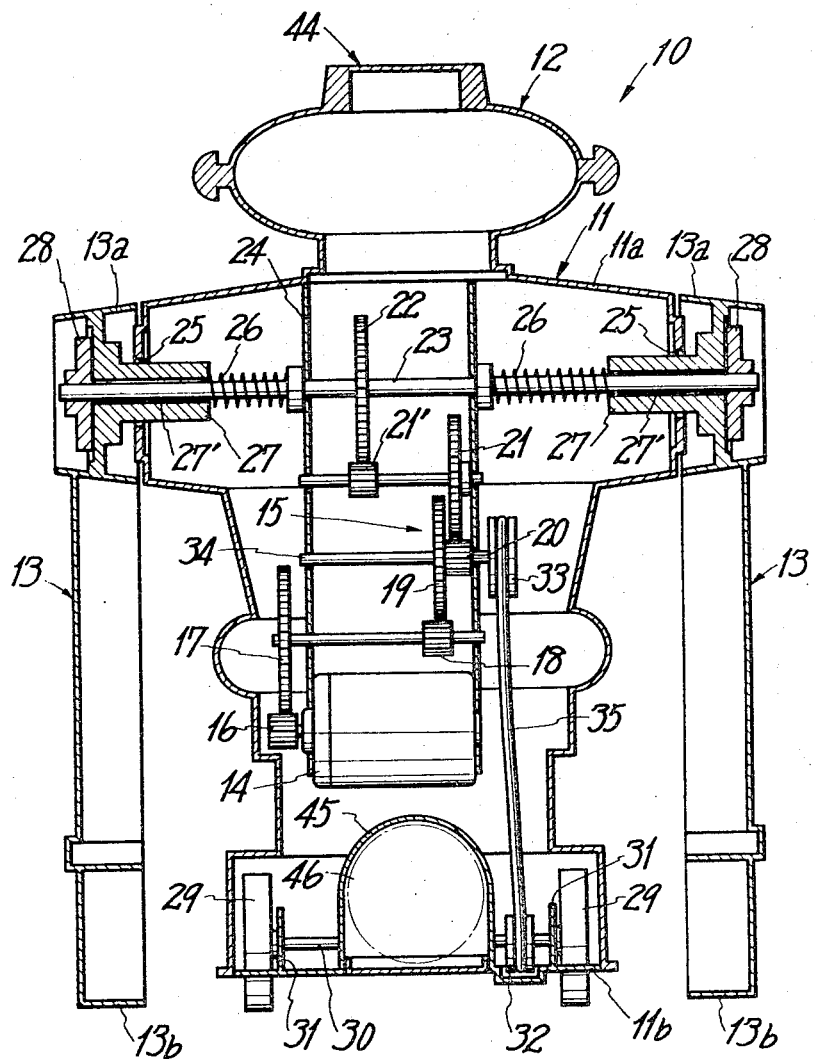

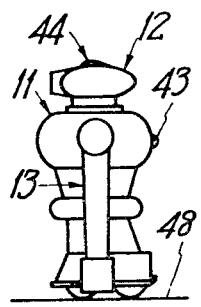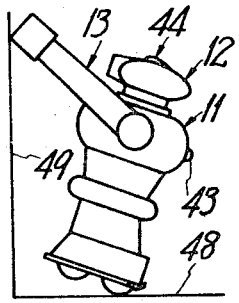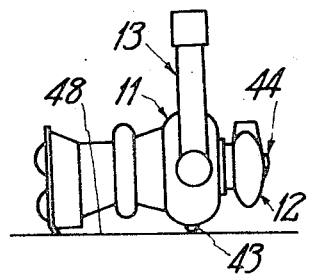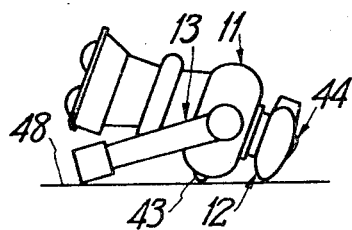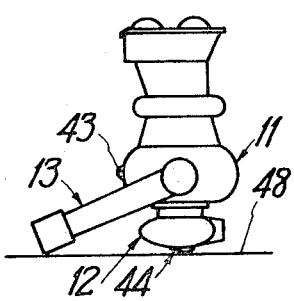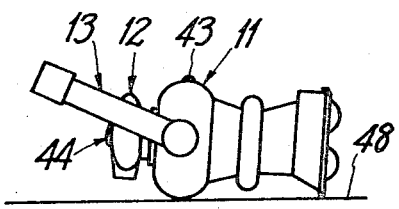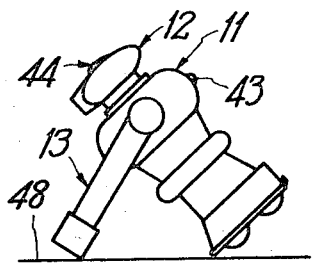

ACROBATIC TOY ROBOT

SUMMARY OF THE INVENTION

This invention relates to a toy, and more particularly to an acrobatic toy robot which can afford considerable enjoyment to observers due to its comical operation.

It is one object of the present invention to provide an acrobatic toy robot which is capable of travelling on a supporting surface in an upright position while swinging its arms.

It is another object of the present invention to provide an acrobatic toy robot which is capable of performing a comical somersault-like movement which will be very entertaining and interesting to children.

It is a further object of the present invention to provide a toy of the kind stated which is simple in construction and operation, durable in use and which can be manufactured and sold at a reasonable cost.

These and other objects, features and advantages of the present invention will become apparent from the following description taken in connection with the accompanying drawings which illustrate a preferred embodiment of the present invention and in which:

FIG. 2 is a vertical cross-sectional view, in an enlarged scale, of the robot shown in FIG. 1;

FIG. 4 is a schematic view showing the state in which the robot is travelling on the supporting surface in an upright position; and FIGS. 5A through 5F are schematic views showing the sequential stages in which the robot performs a somersault-like movement, respectively.

In FIGS. 1 to 5F, like portions or parts are designated with like numerals.

Figure 1:
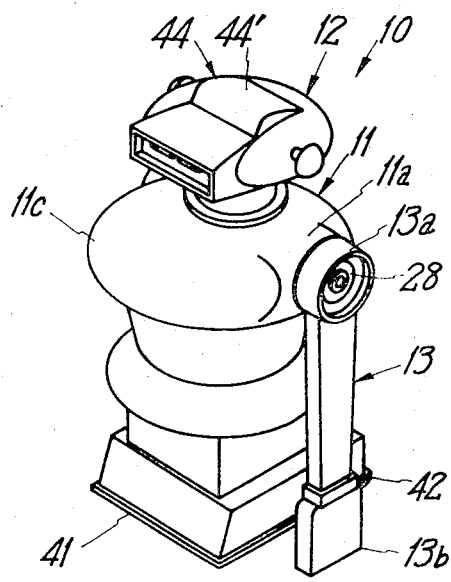
FIG. 1 is a perspective view of an acrobatic toy robot according to the present invention.

Referring to the drawings in FIGS. 1 and 2, there is shown an acrobatic toy robot 10 as one embodiment of the present invention. The robot 10 comprises a hollow body 11, a stationary head 12 and rotatable arms 13. In the illustrated embodiment, the body 11 is composed of two symmetrical sections which are removably secured together.

The rotatable arms 13 are each rotatably attached at its base portion 13a to each of shoulders 11a which project laterally outwardly from upper side portions of the body 11, respectively. The length of each of the rotatable arms 13 is such that the free end 13b of it extends nearly to the level of a supporting surface, such as the surface of a floor, when the arm is rotated and the free end is faced to the surface in the state in which the robot 10 is placed on the surface upright.

Within the hollow body 11 is mounted an electric motor 14 which is operatively connected to the arms 13 via a gear train 15 which includes a pinion 16 mounted on the output shaft of the motor 14, a gear wheel 17, a pinion 18, a gear wheel 19, a pinion 20, a gear wheel 21, a pinion 21' and a gear wheel 22, so that the arms 13 are driven by the motor 14 for rotation. The last gear wheel 22 of the gear train 15 is mounted on a horizontally extending driving shaft 23 which is rotatably supported by a frame 24 disposed within the body 11 and carrying the motor 14.

The ends of the horizontally extending driving shaft 23 project laterally outwardly through openings 25 formed in side walls of the shoulders 11a, respectively. Each end portion of the driving shaft 23 supports each arm 13 for rotation at the base portion 13a thereof.

In the illustrated embodiment, each arm 13 is supported, at its base portion 13a, on each end portion of the driving shaft 23 in such a way that a coil spring 26 is first mounted on the shaft 23, whereupon the boss 27 having an axial bore 27' and extending inwardly from the base portion 13a is inserted into the opening 25 of the shoulder 11a, after passing the end of the shaft 23 through the axial bore 27', against the action of the coil spring 26, and then a locking member 28 engageable with the outer face of the boss 27 is fixedly mounted on the end of the shaft 23, whereby the arm 13 is secured to and rotatable with the driving shaft 23.

Indicated by numeral 29 are driven wheels for propelling the robot 10 on the supporting surface. The driven wheels 29 are secured to and rotatable with an axle 30 rotatably supported by brackets 31 mounted on the bottom 11b of the body 11. A grooved pulley 32 is fixedly mounted on the axle 30 and another grooved pulley 33 on the shaft 34 which carries the gear wheel 19 and the pinion 20. A belt 35 passes over and around the two pulleys 32 and 33 so that when the motor 14 is actuated, rotational movement is transmitted therefrom to the driven wheels 29 via the gear train 15 and the belt means 35.

Figure 3:
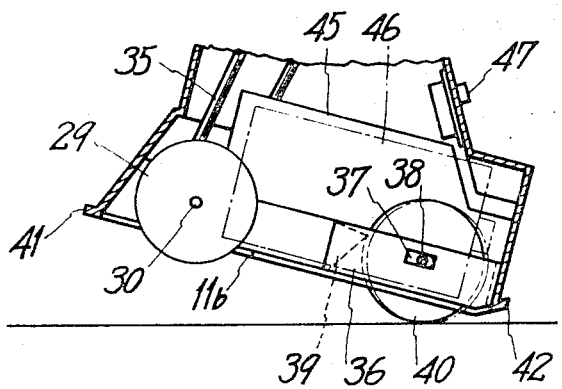
FIG. 3 is a vertically cross-sectioned side view of a bottom portion of the robot, illustrating means for driving the robot on a supporting surface in an upright position.

Two pairs of brackets 36, partially shown in FIG. 3, are also mounted on the bottom 11b of the body 11 and each pair of brackets are provided with elongated horizontally extending slots 37 which are opposed to each other. Two axles 38, only one of which is shown in FIG. 3, are rotatably and reciprocally mounted in the elongated slots 37 in parallel spaced-apart relation to the axle 30 of driven wheels 29 and carry wheels 40 thereon, respectively.

In the illustrated embodiment, the driven wheels 29 are front wheels and the wheels 40 rear wheels. The function of the rear wheels 40 will be described later.

The bottom plate 11b is of a substantially square shape and is provided at its front end with a forwardly projecting edge portion 41 and at its rear end with an inclined sled-like portion 42 for the purposes which will be described later.

In the illustrated embodiment, the body 11 is of a generally cylindrical shape and is provided at its upper part with a radially outwardly swelling portion 11c having on its back a plurality of projections 43 which are made of a resilient material so that they can serve as shock-absorbers when the robot 10 falls on its back.

Also, the head 12 is provided at its upper surface with an upwardly projecting portion 44 which has a rearwardly sloping surface 44' for the purpose which will be explained later. The size or diameter of the head 12 is made smaller than that of the annularly swelling portion 11c of the body 11.

Indicated by numeral 45 is a compartment for replaceably receiving dry cell batteries 46 which supply power to the electric motor 14. Numeral 47 indicates manually operable switch means for closing and opening the motor circuit.

When it is desired to operate the robot 10, it is only necessary that the robot is placed upright on the supporting surface 48 and the switch 47 is turned to on. As the switch is turned to on, the electric motor 14 starts rotating and transmits its driving power to the arms 13 for rotation through the medium of the gear train 15 and the driving shaft 23 and also to driven wheels 29 for rotation, whereby the robot 10 is caused to travel on the supporting surface in an upright position, as shown in FIG. 4, while swinging the arms 13 in a counterclockwise direction.

As the robot further travels forwards and comes into contact with an obstruction 49, such as a wall, as shown in FIG. 5A, it is caused to fall on its back as illustrated in FIG. 5B by the arms 13 rotating. In this respect, it should be noted that the provision of the sled-like portion 42 at the rear end of the bottom 11b facilitates the robot to fall on its back, and that the provision of the resilient projections 43 on the back of the robot will absorb the shock applied thereto when the robot falls on its back.

After the robot fell on its back, it will start to stand on its head 12 and arms 13 as shown in FIG. 5C and then assume the upside-down position shown in FIG. 5D. Then, immediately after the robot assumes the upside-down position, it will fall on its face as shown in FIG. 5E. In this connection, it is to be noted that the provision of the rearwardly sloping projection 44 on the top of the head 12 will assist the robot in assuming the upside-down position and also in falling on its face.

Whereupon, the robot will start to stand on its base portion with the front edge 41 of bottom plate 11b as a support, as shown in FIG. 5F, and then return to the upright position. Thus, the robot can repeat travelling in an upright position with the driven wheels 29 and performing a somersault-like movement with the arms 13 on the supporting surface.

It is to be noted that when the robot starts to fall on its back, the weight of it causes the rear axles 38 to move up obliquely in the elongated slots 37 until the outer periphery of each rear wheel 40 engages each stopper 39 provided on the bottom 11b, thereby preventing each rear wheel 40 from rotation so that the robot can easily fall on its back without being moved forwards by the rear wheels.

It will be seen from the foregoing that when the robot stands on its bottom or head, it performs the action with the arms rotating, and when it falls on its back or face, the falling is effected with the weight of the robot being unbalanced by the action of the arms.

It is to be noted that when it is desired to make the robot perform a somersault-like movement, the arms must be set in the same direction, if they are not in the same direction and that when it is not desired to do so, one has only to set the arms in different directions. In order to set the arms in different directions, it is only necessary that the base portion of one of the arms is first pushed inwardly against the action of the aforementioned spring and at the same time the arm is rotated until it assumes a desired angular position.

Finally, it is to be understood that although the robot herein shown and described is not provided with legs, it may, of course, be provided with legs of any suitable construction or design and having wheel means for propelling the robot on the supporting surface in an upright position.

What I claim is:

1. An acrobatic toy robot adapted to be placed upright upon a supporting surface and propelled therealong comprising a hollow body having a vertical length dimension, a pair of arms, rotatably mounted upon said body each having a longitudinal length dimension, power means mounted within said body and engaging said arms to effect simultaneous rotation thereof relative to said body, first wheel means operatively connected to said power means to propel said robot, second wheel means freely rotatable and aperatively associated with said first wheel means to support said robot on a supporting surface in an upright position, and means to facilitate falling of said robot from said upright position when said robot is inclined therefrom, said facilitating means including stop means operative to engage said second wheel means to prevent rotation thereof, said longitudinal length dimension of each of said arms being of such a predetermined measurement relative to said vertical length dimension of said body that said arms extend nearly to said supporting surface when said robot is placed in an upright position on said supporting surface, whereby rotation of said arms relative to said body is operative, due to the relationship between said vertical length dimension of said body and said longitudinal length dimension of said arms, to effect a complete somersault movement of said robot by engagement of said arms against said supporting surface to return said robot to an upright position when it has been displaced therefrom.

2. A robot according to claim 1, wherein said hollow body comprises an upper portion having shoulder portions projecting laterally thereacross, with said rotatable arms being secured at said shoulder portions, said hollow body being of a generally cylindrical shape and having said upper portions thereof formed into a radially outwardly swelling configuration.

3. A robot according to claim 1, wherein said hollow body includes a bottom portion having a rear end, a forward side, a rearward side and a head having a top surface, and wherein said facilitating means further including an inclined sled-like portion formed at the rear end of said bottom portion of said hollow body to facilitate falling of said robot onto its rearward side, said robot further comprising a projection formed on said top surface of said head and having a rearwardly sloping configuration to facilitate falling of said robot onto said forward side.

4. A robot according to claim 3, wherein said bottom portion of said hollow body includes a forward end, with said first wheel means being disposed at said forward end, said bottom portion being of a substantially square shape and including at said forward end means adapted to contact the supporting surface for facilitating regaining by the robot of an upright position after it has fallen therefrom.

* * * * *